United States Patent
Li et al.

(10) Patent No.: US 10,928,687 B1
(45) Date of Patent: Feb. 23, 2021

(54) DISPLAY DEVICE AND DRIVING METHOD THEREOF

(71) Applicant: BOE Technology Group Co., Ltd., Beijing (CN)

(72) Inventors: Zhongxiao Li, Beijing (CN); Qingxun Zhang, Beijing (CN); Wenqing Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/826,256

(22) Filed: Mar. 22, 2020

(30) Foreign Application Priority Data

Jul. 31, 2019 (CN) .......................... 201910699115.7

(51) Int. Cl.
*G09G 3/36* (2006.01)
*G02F 1/1343* (2006.01)
*G02F 1/1362* (2006.01)

(52) U.S. Cl.
CPC .. *G02F 1/134309* (2013.01); *G02F 1/136286* (2013.01); *G09G 3/3607* (2013.01); *G09G 3/3648* (2013.01); *G02F 2001/134345* (2013.01); *G02F 2201/307* (2013.01)

(58) Field of Classification Search
CPC ..... G09G 3/2203; G09G 3/3406–3426; G09G 3/36–3696; G09G 2300/0439–0895; G09G 3/18; G09G 5/02
See application file for complete search history.

(56) References Cited

U.S. PATENT DOCUMENTS

2016/0363781 A1* 12/2016 Wu ........................ G02B 30/36
2020/0103697 A1* 4/2020 Tan ....................... G02B 6/0036

* cited by examiner

*Primary Examiner* — Sanghyuk Park
(74) *Attorney, Agent, or Firm* — Arent Fox LLP; Michael Fainberg

(57) ABSTRACT

A display device and a driving method thereof are disclosed. The display device comprises: an array substrate, an opposite substrate and a liquid crystal layer; the display device includes sub-pixel areas including a shading area and a light-transmitting area; the sub-pixel area includes an electrode structure and a first shading part, and the electrode structure includes: first electrodes, second electrodes and third electrodes; the first electrodes are divided into first type electrodes and second type electrodes; the electrode structure is configured to: apply the same voltage to the first type electrode, the second electrode and the third electrode, apply different voltages to the first type electrode and the second type electrode to control liquid crystal molecules to form a liquid crystal lens; or apply different voltages to the second electrode and the third electrode to control the liquid crystal molecules to form a liquid crystal grating.

16 Claims, 4 Drawing Sheets

DISPLAY DEVICE AND DRIVING METHOD THEREOF

CROSS REFERENCE TO RELATED APPLICATION

This application claims priority to Chinese Patent Application No. 201910699115.7, filed with the Chinese Patent Office on Jul. 31, 2019. The entire disclosure of the above application is incorporated herein by reference.

FIELD

The present disclosure relates to the technical field of display, in particular to a display device and a driving method thereof.

BACKGROUND

Various display technologies constantly emerge in the development of the display technologies. The transparent display technology has attracted more and more attention due to the transmissive optical property of display panel. And because of this property, not only pictures can be displayed on a display screen, but also the views behind the display screen can be observed through the display screen, therefore, the transparent display device is more applicable to building windows, car windows, shop windows, etc.

Liquid crystal display, owing to a series of advantages including high color gamut, lightweight and fast response speed, is a display device used in large scales currently, and has mature technologies in both theoretical research and practical process.

SUMMARY

The embodiments of the present disclosure provide a display device and a driving method thereof.

In a first aspect, an embodiment of the present disclosure provides a display device, where the display device includes: an array substrate and an opposite substrate which are disposed oppositely, and a liquid crystal layer disposed between the array substrate and the opposite substrate;

the display device includes a plurality of sub-pixel areas, and the sub-pixel area is divided into a shading area and a light-transmitting area;

the sub-pixel area includes an electrode structure, and the electrode structure includes: a plurality of first electrodes disposed between the opposite substrate and the liquid crystal layer, a plurality of second electrodes disposed between the array substrate and the liquid crystal layer, and a third electrode disposed between the array substrate and the second electrode, wherein the first electrodes are divided into first type electrodes and second type electrodes which are disposed alternately;

the sub-pixel area further includes: a first shading part disposed in the shading area and disposed on a side, facing away from the liquid crystal layer, of the first electrode;

the electrode structure is configured to: apply the same voltage to the first type electrode, the second electrode and the third electrode, apply different voltages to the first type electrode and the second type electrode, and control liquid crystal molecules in the liquid crystal layer to be oriented to form a liquid crystal lens, such that light passing through the liquid crystal lens converges to the first shading part; and the electrode structure is further configured to: apply no voltage to the first electrode, apply different voltages to the second electrode and the third electrode, and control the liquid crystal molecules to be oriented to form a liquid crystal grating, such that at least part of the light passing through the liquid crystal grating is emitted from the light-transmitting area.

In some embodiments, a main axis of the liquid crystal lens passes through the first shading part.

In some embodiments, the first electrode and the second electrode are strip electrodes, and the third electrode is a planar electrode; and a plurality of first electrodes and a plurality of second electrodes in the electrode structure are all disposed along a first direction; the first type electrodes are disposed in even-numbered columns of the electrode structure, the second type electrodes are disposed in odd-numbered columns of the electrode structure, and in the direction vertical to the array substrate, the orthographic projection of the first type electrode and the orthographic projection of the first shading part have an overlapping area.

In some embodiments, in the direction vertical to the array substrate, the orthographic projection of the first electrode and the orthographic projection of the second electrode have an overlapping area.

In some embodiments, in the first direction, the width of the first electrode is smaller than the width of the second electrode.

In some embodiments, each of the sub-pixel areas includes n first shading parts, wherein n is a positive integer; the electrode structure includes 2n+1 first electrodes and 2n+1 second electrodes.

In some embodiments, each of the sub-pixel areas only includes one third electrode.

In some embodiments, the sub-pixel area further includes: a first thin film transistor connected with the first type electrode, and a second thin film transistor connected with the second type electrode.

In some embodiments, the sub-pixel area further includes: a third thin film transistor connected with the third electrode; and in a direction vertical to the plane in which the display device is located, the orthographic projection of the first thin film transistor overlaps the orthographic projection of the third thin film transistor, or the orthographic projection of the second thin film transistor overlaps the orthographic projection of the third thin film transistor.

In some embodiments, the distance between the liquid crystal grating and the first shading part is greater than the distance between the liquid crystal lens and the first shading part.

In some embodiments, the display device further includes: a first insulating layer disposed between the first electrode and the liquid crystal layer, a second insulating layer disposed between the first electrode and the first shading part, and a third insulating layer disposed between the third electrode and the second electrode.

In some embodiments, the array substrate includes: a transparent substrate, and a light taking layer disposed on a side, facing the liquid crystal layer, of the transparent substrate.

In some embodiments, the light taking layer includes light taking grating structures disposed on a whole surface, or the light taking layer includes a plurality of light taking grating structures.

In some embodiments, the first electrode, the second electrode and the third electrode are all transparent electrodes.

In a second aspect, an embodiment of the present disclosure provides a driving method of the above display device, the method including:

receiving signals of an image to be displayed; and providing voltage signals to the electrode structure according to gray-scale value of each of the plurality of sub-pixel areas in the signals of the image to be displayed, such that the liquid crystal molecules in the liquid crystal layer of each of the plurality of sub-pixel areas are oriented to form a liquid crystal lens or a liquid crystal grating.

In some embodiments, the step of providing voltage signals to the electrode structure according to gray-scale value of each of the plurality of sub-pixel areas in the signals of the image to be displayed, such that the liquid crystal molecules in the liquid crystal layer of each of the sub-pixel areas are oriented to form a liquid crystal lens or a liquid crystal grating specifically includes:

when the gray-scale value of each of the plurality of sub-pixel areas in the signals of the image to be displayed fall within a first preset gray-scale range, applying the same voltage signal to the first type electrode, the second electrode and the third electrode of the sub-pixel area, and applying different voltage signals to the second type electrode and the first type electrode of the sub-pixel area, to control the liquid crystal molecules in the liquid crystal layer of the sub-pixel area to be oriented to form a liquid crystal lens; and when the gray-scale value of the each of the plurality of sub-pixel areas in the signals of the image to be displayed fall within a second preset gray-scale range, applying no voltage signal to the first electrode of the sub-pixel area, and applying different voltage signals to the second electrode and the third electrode of the sub-pixel area, such that the liquid crystal molecules in the liquid crystal layer of the sub-pixel area are oriented to form a liquid crystal grating;

where the gray-scale value in the first preset gray-scale range is smaller than the gray-scale value in the second preset gray-scale range.

BRIEF DESCRIPTION OF THE DRAWINGS

In order to more clearly illustrate technical solutions in embodiments of the present disclosure, a brief introduction will be given below on accompanying drawings which need to be used in the description of the embodiments. Apparently, the accompanying drawings described below are merely some embodiments of the present disclosure. Those skilled in the art can obtain other accompanying drawings according to these drawings without any creative effort.

FIG. 4 is a schematic diagram of still another display device according to an embodiment of the present disclosure;

DETAILED DESCRIPTION OF THE EMBODIMENTS

A liquid-crystal display (LCD) is a flat-panel display or other electronically modulated optical device that uses the light-modulating properties of liquid crystals combined with polarizers, that is, liquid crystals change the polarization state of the light by utilizing upper and lower polarizers and a liquid crystal cell structure, such that part of the linearly polarized light can be emitted, while part of the linearly polarized light cannot be emitted. However, the polarizer always leads to a dramatic decline of light transmissivity, especially for a transparent display device, the polarizer on the surface of a panel will absorb a large amount of ambient light, such that the transparency of a device is extremely poor, for example, the liquid crystal display product has a low light transmissivity and a poor transparent display effect, such that the applications of the liquid crystal display devices in the transparent field are seriously limited.

Figure 1:
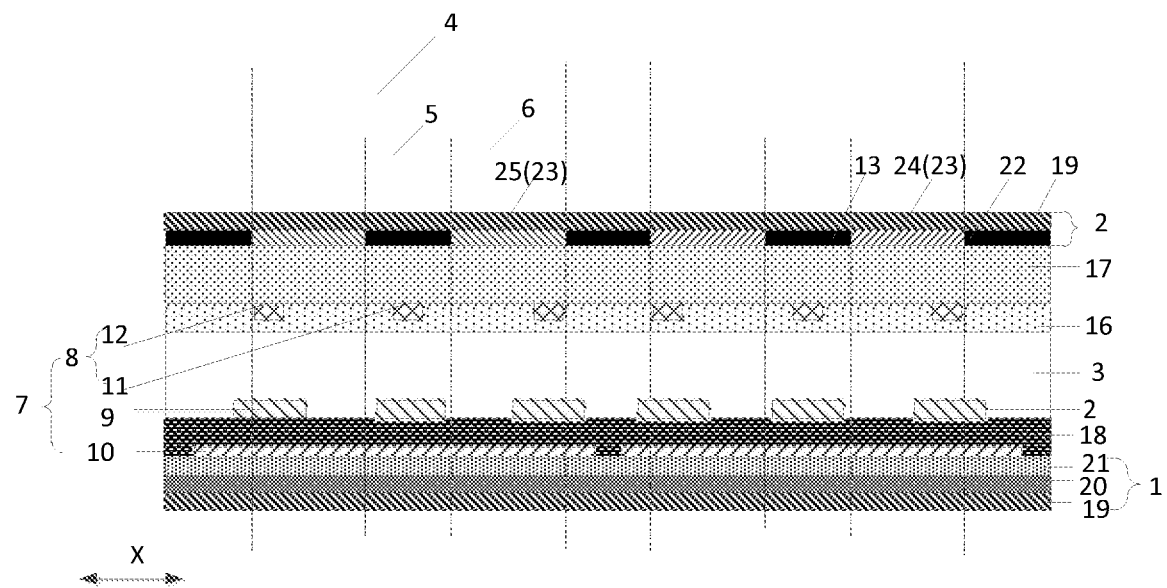
FIG. 1 is a schematic diagram of a display device according to an embodiment of the present disclosure.

An embodiment of the present disclosure provides a display device, and as shown in FIG. 1, the display device includes an array substrate 1 and an opposite substrate 2 which are disposed oppositely, and a liquid crystal layer 3 disposed between the array substrate 1 and the opposite substrate 2.

The display device includes a plurality of sub-pixel areas 4, and the sub-pixel areas each 4 is divided into a shading area 5 and a light-transmitting area 6.

The sub-pixel area 4 includes an electrode structure 7, and the electrode structure 7 includes: a plurality of first electrodes 8 disposed between the opposite substrate 2 and the liquid crystal layer 3, a plurality of second electrodes 9 disposed between the array substrate 1 and the liquid crystal layer 3, and a third electrode 10 disposed between the array substrate 1 and the plurality of second electrodes 9, where the first electrode 8 includes first type electrodes 11 and the second type electrodes 12 which are disposed alternately.

The sub-pixel area 4 further includes: a first shading part 13 located in the shading area 5 and disposed on a side, facing away from the liquid crystal layer 3, of the first electrode 8.

Figure 2:
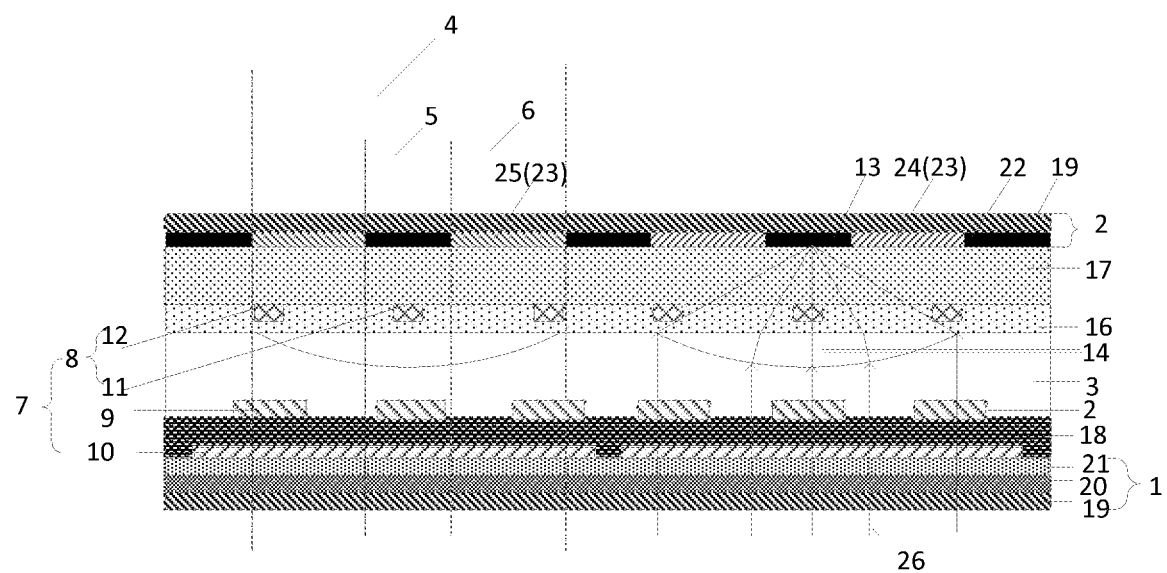
FIG. 2 is a schematic diagram of another display device according to an embodiment of the present disclosure.

The electrode structure 7 is configured to: apply the same voltage to the first type electrode 11, the second electrode 9 and the third electrode 10, apply different voltages to the first type electrode 11 and the second type electrode 12, as shown in FIG. 2, to orient liquid crystal molecules in the liquid crystal layer to form a liquid crystal lens 14, such that light passing through the liquid crystal lens 14 converges to the first shading part 13.

Figure 3:
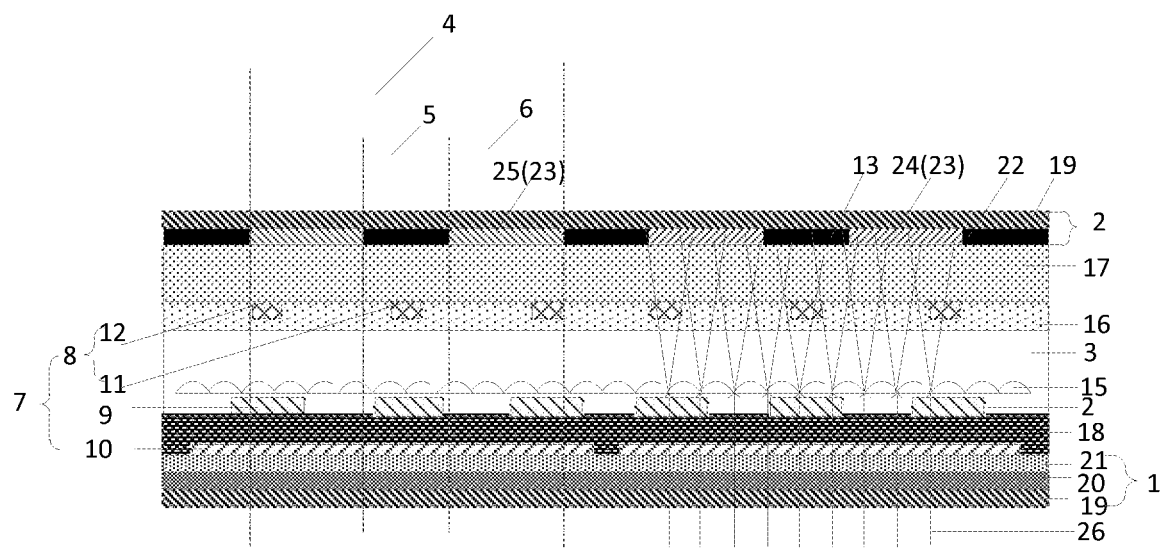
FIG. 3 is a schematic diagram of still another display device according to an embodiment of the present disclosure.

The electrode structure 7 is further configured to: apply no voltage to the first electrode 8, apply different voltages to the second electrode 9 and the third electrode 10, as shown in FIG. 3, to orient the liquid crystal molecules to form a liquid crystal grating 15, such that at least part of the light passing through the liquid crystal grating 15 is emitted from the light-transmitting area 6.

As to the display device provided in the embodiment of the present disclosure, the liquid crystal molecules in the liquid crystal layer are oriented under control to form a liquid crystal lens, such that the display device can realize dark-state display. In particular, an optical axis of the liquid crystal lens extends to the first shading part, for example, as shown in FIG. 2, a focal point of the formed liquid crystal lens 14 is controlled to be located at a position in the first shading part 13, such that the first shading part 13 shields the converging light 26, and 0 gray-scale display is realized. When other dark-state gray scales need to be realized, the liquid crystal molecules can be oriented under control to change the thickness of the formed liquid crystal lens, so as to change the position of the focal point of the liquid crystal lens, such that the first shading part shields part of the light. In this way, the light output from each sub-pixel area can be changed through adjusting the thickness of the liquid crystal lens, thereby realizing different gray scales. The liquid crystal molecules are controlled to be oriented to form a liquid crystal grating, as shown in FIG. 3, the liquid crystal grating 15 can scatter the collimated incident light, and the light 26 scattered by the liquid crystal grating 15 is emitted from the light-transmitting area 6, to realize bright-state display. Correspondingly, the light output from the sub-pixel area can be adjusted through adjusting the period of the liquid crystal grating, so as to realize different gray scales.

As to the display device provided in the embodiment of the present disclosure, liquid crystals in the liquid crystal layer can be controlled to be oriented to form a liquid crystal lens or a liquid crystal grating, and light output from the sub-pixel area is adjusted by utilizing the liquid crystal lens or the liquid crystal grating, and gray scales can be realized without using polarized light, therefore, no polarizer needs to be set on the display device provided in the embodiment of the present disclosure, thereby improving light transmittance of the display device, and improving transparent display effect especially for the transparent display device.

It should be noted that, FIG. 2 is a schematic diagram illustrating the arrangement of liquid crystal molecules of a liquid crystal lens 14 which is equivalent to a liquid crystal lens after the liquid crystal molecules are oriented under control, and FIG. 3 is a schematic diagram illustrating the arrangement of liquid crystal molecules of a liquid crystal grating 15 which is equivalent to a liquid crystal grating after the liquid crystal molecules are oriented under control.

In some embodiments, as to the display device shown in FIG. 1 to FIG. 3 provided in the embodiment of the present disclosure, a main axis of the liquid crystal lens 14 passes through the first shading part 13.

In some embodiments, as to the display device shown in FIG. 1 to FIG. 3 provided in the embodiment of the present disclosure, the first electrode 8 and the second electrode 9 are strip electrodes, and the third electrode 10 is a planar electrode.

The plurality of first electrodes 8 and a plurality of second electrodes 9 in the electrode structure 7 are all disposed along a first direction X; the first type electrodes 11 are disposed in even-numbered columns of the electrode structure 7, the second type electrodes 12 are disposed in odd-numbered columns of the electrode structure 7, and in the direction vertical to the array substrate 1, the orthographic projection of the first type electrode 11 and the orthographic projection of the first shading part 13 have an overlapping area.

In some embodiments, in the display device shown in FIG. 1 to FIG. 3 provided in the embodiment of the present disclosure, in the direction vertical to the array substrate 1, the orthographic projection of the first type electrode 11 falls within the orthographic projection of the first shading part 13.

In some embodiments, common voltage Vcom signals are applied to the first type electrodes, the second electrodes and the third electrodes, and driving voltage Vop signals are applied to the second type electrodes, so as to control the liquid crystal molecules to be oriented to form a liquid crystal lens. Or, Vcom signals are applied to the second electrodes, and Vop signals are applied to the third electrodes, the liquid crystal molecules close to the second electrode are controlled, by being driven under an electric field, to be oriented to be in an arch arrangement which is equivalent to a liquid crystal grating.

In some embodiments, as to the display device shown in FIG. 1 to FIG. 3 provided in the embodiment of the present disclosure, in the direction vertical to the array substrate 1, the orthographic projection of the first electrode 8 and the orthographic projection of the second electrode 9 have an overlapping area.

As to the display device provided in the embodiment of the present disclosure, when the first electrodes and the second electrodes are in one-to-one correspondence, the arrangement period of the first electrodes can be the same as the arrangement period of the second electrodes. The arrangement period of the first electrodes and the second electrodes can be selected according to actual requirements. For example, when the liquid crystal lenses need to be in one-to-one correspondence with the sub-pixel areas, the arrangement period of the first strip electrodes and the second strip electrodes can be set according to specific size of the sub-pixel area. The arrangement period of the first electrodes and the second electrodes can be for example 3 μm to 10 μm.

In some embodiments, as to the display device shown in FIG. 1 to FIG. 3 provided in the embodiment of the present disclosure, in the first direction X, the width of the first electrode 8 is smaller than the width of the second electrode 9.

In some embodiments, the width of the first strip electrode is smaller than 2 μm; and the width of the second strip electrode is 2-4 μm.

In some embodiments, as to the display device shown in FIG. 1 to FIG. 3 provided in the embodiment of the present disclosure, in the direction vertical to the array substrate 1, the orthographic projection of the first electrode 8 falls within the orthographic projection of the second electrode 9.

As to the display device provided in the embodiment of the present disclosure, since the width of the first electrode is smaller than the width of the second electrode, when voltage is applied to the first electrodes, the second electrodes and the third electrodes, such that liquid crystal molecules are oriented to form a liquid crystal lens with better morphology.

In some embodiments, each of the sub-pixel areas includes n first shading parts, where n is a positive integer; the electrode structure includes 2n+1 first electrodes and 2n+1 second electrodes.

As to the display device provided in the embodiment of the present disclosure, when the same voltage is applied to the first type electrode, the second electrode and the third electrode, and different voltages are applied to the first type electrode and the second type electrode, the liquid crystal molecules in the area corresponding to the first type electrode and two second type electrodes adjacent to the first type electrode are oriented, to form a liquid crystal lens, that is, at least three first electrodes are required to form an equivalent liquid crystal lens.

As to the display device shown in FIG. 1 provided in the embodiment of the present disclosure, each of the sub-pixel areas 4 includes one first shading part 13, correspondingly, when a liquid crystal lens needs to be formed, one sub-pixel area forms one liquid crystal lens, and each electrode structure includes three first electrodes 8 and three second electrodes 9, here the three first electrodes 8 include two second type electrodes 12 and one first type electrode 11.

Figure 4:
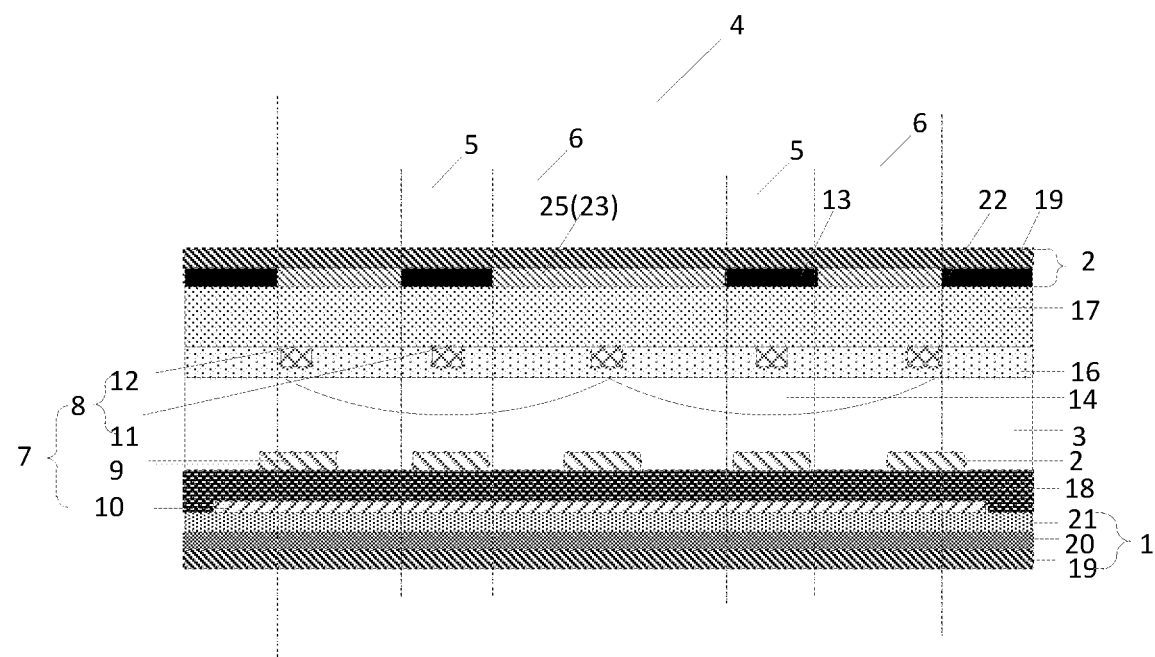
FIG. 4 is

Of course, each sub-pixel area can also include a plurality of first shading parts, correspondingly, when a liquid crystal lens needs to be formed, one sub-pixel area forms a plurality of liquid crystal lenses, and the liquid crystal lenses are in one-to-one correspondence with the first shading parts. As shown in FIG. 4, with each sub-pixel area 4 including two first shading parts 13 as an example, two liquid crystal lenses 14 are formed in one sub-pixel area, therefore, two first type electrodes 11 are required, and the first type electrodes 11 which form two liquid crystal lenses can share the second type electrodes 12, therefore, each sub-pixel area 4 includes five first electrodes 8 and five second type electrodes 9 to form two liquid crystal lenses 14.

In some embodiments, as to the display device shown in FIG. 1 to FIG. 4 provided in the embodiment of the present disclosure, each of the sub-pixel areas 4 only includes one third electrode 10.

In some embodiments, the sub-pixel area further includes: a first thin film transistor connected with the first type electrode, and a second thin film transistor connected with the second type electrode.

As to the display device provided in the embodiment of the present disclosure, in each sub-pixel area, the first type electrode is connected with the first thin film transistor, and the second type electrode is connected with the second thin film transistor, so as to respectively drive the first type electrode and the second type electrode in each sub-pixel, and to apply different voltages to the first type electrode and the second type electrode when a liquid crystal lens needs to be formed. With each sub-pixel area including a first shading part and three first electrodes as an example, each sub-pixel area can be set with one first thin film transistor and one second thin film transistor.

In some embodiments, the sub-pixel area further includes: a third thin film transistor connected with the third electrode.

In the direction vertical to the plane in which the display device is located, the orthographic projection of the first thin film transistor overlaps the orthographic projection of the third thin film transistor, or the orthographic projection of the second thin film transistor overlaps the orthographic projection of the third thin film transistor.

That is, in the display device, a thin film transistor is disposed on the structures at two sides of the liquid crystal layer, when the orthographic projection of the first thin film transistor overlaps the orthographic projection of the third thin film transistor, or the orthographic projection of the second thin film transistor overlaps the orthographic projection of the third thin film transistor, the aperture ratio of the sub-pixel area can be improved while the electrode structure is driven.

Figure 5:
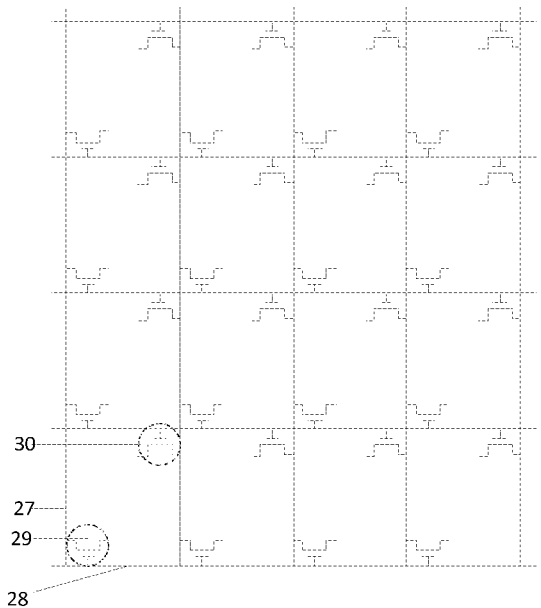
FIG. 5 is a schematic diagram of a first thin film transistor and a second thin film transistor in a display device according to an embodiment of the present disclosure.
Figure 6:
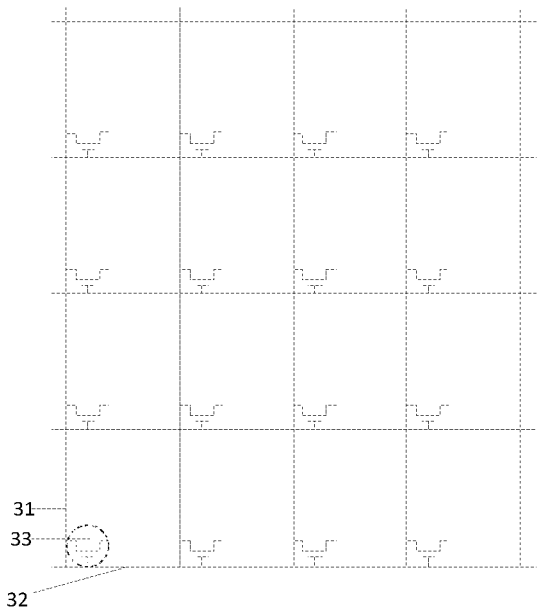
FIG. 6 is a schematic diagram of a third thin film transistor in a display device according to an embodiment of the present disclosure.

With each sub-pixel area including a first shading part and three first electrodes as an example, as shown in FIG. 5, the display device provided in the embodiment of the present disclosure further includes first signal lines 27 and first data lines 28 which are crossed with each other horizontally and vertically, a gate of the first thin film transistor 29 is connected with a first signal line 27, a source or a drain of the first thin film transistor 29 is connected with the first data line 28, a gate of the second thin film transistor 30 is connected with the first signal line 27, and a source or a drain of the second thin film transistor 30 is connected with the first data line 28. As shown in FIG. 6, the display device further includes second signal lines 31 and second data lines 32 which are crossed with each other horizontally and vertically, a gate of the third thin film transistor 33 is connected with the second signal line 31, and a source or a drain of the third thin film transistor 33 is connected with the second data line 32.

In some embodiments, the distance between the liquid crystal grating and the first shading part is greater than the distance between the liquid crystal lens and the first shading part.

It should be noted that, due to the existence of the first shading part, after the collimated light is scattered by the liquid crystal grating, part of the light will enter the first shading part, therefore, only part of the light passing through the liquid crystal grating 15 will be emitted from the light-transmitting area 6, and the distance between the liquid crystal grating and the first shading part is greater than the distance between the liquid crystal lens and the first shading part, thereby reducing as far as possible the shielding of the first shading part on the transmitted light.

In some embodiments, as shown in FIG. 1 to FIG. 4, the display device provided in the embodiment of the present disclosure further includes: a first insulating layer 16 disposed between the first electrode 8 and the liquid crystal layer 3, a second insulating layer 17 disposed between the first electrode 8 and the first shading part 13, and a third insulating layer 18 disposed between the third electrode 10 and the second electrode 9.

As to the display device provided in the embodiment of the present disclosure, since a first insulating layer is disposed between the first electrode and the liquid crystal layer, vertical components of an electric field formed by the electric structure can control the liquid crystal molecules at the side close to the first electrode to be disposed in the same manner, such that the angle of the light passing through will not change.

In some embodiments, the thickness of the first insulating layer can be for example 1 μm to 2 μm.

Of course, a liquid crystal layer with a thick thickness can also be set, such that the vertical components of the electric field formed by the electrode structure can act uniformly on the liquid crystal layer, and the liquid crystal molecules at the side close to the first electrode are disposed in the same manner. The thickness of the liquid crystal layer can be for example 5 μm to 10 μm.

In some embodiments, the thickness of the second insulating layer is greater than 15 μm; and the thickness of the second insulating layer can be for example 30 μm.

In some embodiments, as to the display device shown in FIG. 1 to FIG. 4 provided in the embodiment of the present disclosure, the array substrate 1 further includes: a first pixel circuit layer 21. The first pixel circuit layer can include the second data line, the second signal line and the third thin film transistor.

In some embodiments, as to the display device shown in FIG. 1 to FIG. 4 provided in the embodiment of the present disclosure, the opposite substrate 2 includes a transparent substrate 19, the first shading part 13 is located on a side, close to the liquid crystal layer 3, of the transparent substrate 19, and the opposite substrate further includes: a second shading part 22 disposed on the same layer as the first shading part, and a color resistance 23. The second shading part is located between sub-pixel areas. The first shading part and the second shading part can be for example a black matrix. The color resistance includes a red color resistance, a blue color resistance and a green color resistance. In FIG. 1 to FIG. 3, only color resistances 23 in two colors are shown, and the two color resistances are respectively red color resistances 24 and green color resistances 25. The display device further includes: a second insulating layer and a second pixel circuit layer between the first electrodes, and the second pixel circuit layer includes the first data line, the first signal line, the first thin film transistor and the second thin film transistor.

The display device can further include: a first orientation layer disposed on a side, facing the opposite substrate, of the liquid crystal layer, and a second orientation layer on a side, facing the array substrate, of the liquid crystal layer.

In some embodiments, the array substrate 1 includes: a transparent substrate 19, and a light taking layer 20 disposed on a side, facing the liquid crystal layer 3, of the transparent substrate 19.

As the display device provided in the embodiment of the present disclosure includes a transparent substrate and a light taking layer, the light entering the liquid crystal layer is collimating light.

In some embodiments, the light taking layer includes light taking grating structures disposed on a whole surface, or the light taking layer includes a plurality of light taking grating structures.

The light taking layer further includes a planarization layer disposed above the light taking grating structure. When the light taking layer includes a plurality of light taking grating structures, the planarization layer can flatten the gap between the light taking grating structures, and enable the light taking layer to have a flat surface.

In some embodiments, the first electrode, the second electrode and the third electrode are all transparent electrodes.

In some embodiments, the material of the first electrode, the second electrode and the third electrode is indium tin oxide (ITO).

In some embodiments, the display device provided in the embodiment of the present disclosure can be a transparent display device, and the light-transmitting area includes a transparent area. When the display device is a transparent display device, each insulating layer is a light-transmitting insulating layer.

Figure 7:
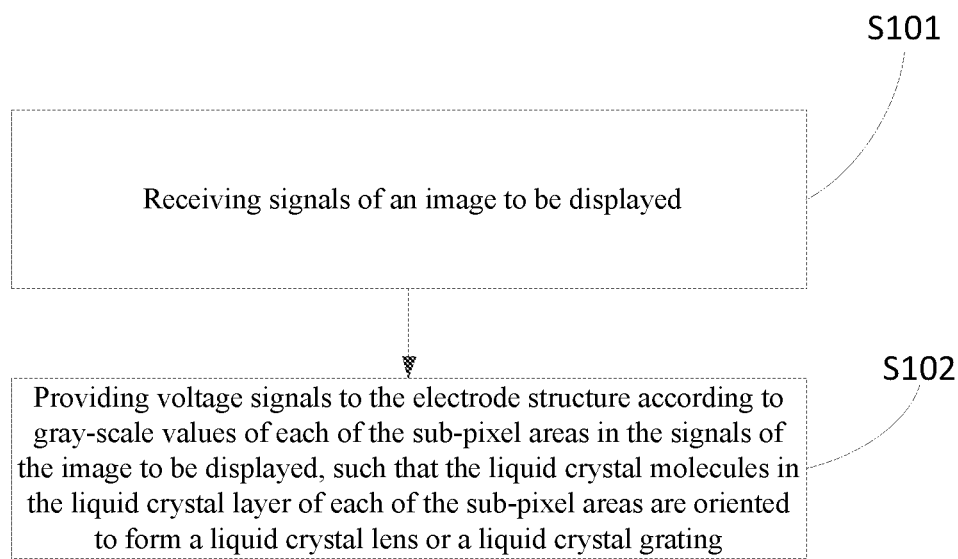
FIG. 7 is a schematic diagram of a driving method of a display device according to an embodiment of the present disclosure.

The embodiment of the present disclosure provides a driving method of the above display device, and as shown in FIG. 7, the method includes:

S101, receiving signals of an image to be displayed; and

S102, providing voltage signals to the electrode structure according to gray-scale values of each of the sub-pixel areas in the signals of the image to be displayed, such that the liquid crystal molecules in the liquid crystal layer of each of the sub-pixel areas are oriented to form a liquid crystal lens or a liquid crystal grating.

In some embodiments, the step of providing voltage signals to the electrode structure according to gray-scale values of each of the sub-pixel areas in the signals of the image to be displayed, such that the liquid crystal molecules in the liquid crystal layer of each of the sub-pixel areas are oriented to form a liquid crystal lens or a liquid crystal grating specifically includes:

when the gray-scale values of the sub-pixel area in the signals of the image to be displayed fall within a first preset gray-scale range, applying the same voltage signal to the first type electrode, the second electrode and the third electrode of the sub-pixel area, and applying different voltage signals to the second type electrode and the first type electrode of the sub-pixel area, to control the liquid crystal molecules in the liquid crystal layer of the sub-pixel area to be oriented to form a liquid crystal lens; and when the gray-scale values of the sub-pixel area in the signals of the image to be displayed fall within a second preset gray-scale range, applying no voltage signal to the first electrode of the sub-pixel area, and applying different voltage signals to the second electrode and the third electrode of the sub-pixel area, to control the liquid crystal molecules in the liquid crystal layer of the sub-pixel area to be oriented to form a liquid crystal grating;

where the gray-scale values in the first preset gray-scale range is smaller than the gray-scale values in the second preset gray-scale range.

That is, the first preset gray-scale range corresponds to a dark state, and the second preset gray-scale range corresponds to a corresponding bright state. Then, working principles of the dark state and the bright state are illustrated with examples. For any sub-pixel area, when dark-state display is required, for example, driving voltage Vop signals can be applied to the first type electrode, the second electrode and the third electrode corresponding to the sub-pixel area, and common voltage Vcom signals are applied to the second type electrode, at this time, the liquid crystals in the sub-pixel area are oriented under the driving of an electric field, and an equivalent convex lens facing the array substrate is formed. With the display panel as shown in FIG. 2 as an example, the focal point of the liquid crystal lens 14 is located in the first shading part 13, parallel light converges under the effect of the liquid crystal lens 14, and the first shading part 13 in the sub-pixel shields the converging light, so as to realize dark-state display. When bright-state display is required, for example, no voltage signal can be applied to the first type electrode and the second type electrode corresponding to the sub-pixel area, common voltage Vcom signals are applied to the second electrode, and driving voltage Vop signals are applied to the third electrode. At this time, the liquid crystals in the sub-pixel area are oriented as driven by an electric field, to equivalently form a liquid crystal grating. With the display panel shown in FIG. 3 as an example, the liquid crystal grating 15 can scatter the collimated incident light 26, and the scattered light is emitted through the color resistance 23 in the sub-pixel, so as to realize bright-state display.

In summary, as to the display device and the driving method thereof provided in the embodiment of the present disclosure, liquid crystals in the liquid crystal layer can be controlled to be oriented to form a liquid crystal lens or a liquid crystal grating, and light output of the sub-pixel area is adjusted by utilizing the liquid crystal lens or the liquid crystal grating, and gray scales can be realized with no need of polarized light, so no polarizer needs to be set on the display device provided in the embodiment of the present disclosure, thereby improving light transmittance of the display device, and improving transparent display effect especially for the transparent display device.

Evidently, those skilled in the art can make various modifications and variations to the present disclosure without departing from the spirit and scope of the present disclosure. Accordingly, the present disclosure is also intended to encompass these modifications and variations thereto so long as the modifications and variations come into the scope of the claims appended to the application and their equivalents.

The invention claimed is:

1. A display device, comprising:
an array substrate and an opposite substrate which are disposed oppositely, and
a liquid crystal layer disposed between the array substrate and the opposite substrate;
wherein the display device comprises a plurality of sub-pixel areas, and each of the plurality of sub-pixel areas comprises a shading area and a light-transmitting area;
each of the plurality of sub-pixel areas comprises an electrode structure, and the electrode structures comprises: a plurality of first electrodes disposed between the opposite substrate and the liquid crystal layer, a plurality of second electrodes disposed between the array substrate and the liquid crystal layer, and a third electrode disposed between the array substrate and the second electrode, wherein the first electrodes comprises first type electrodes and second type electrodes which are disposed alternately;

each of the plurality of sub-pixel areas further comprises: a first shading part located in the shading area and disposed on a side, facing away from the liquid crystal layer, of the first electrode;

the electrode structure is configured to: apply a same voltage to the first type electrode, the second electrode and the third electrode, apply different voltages to the first type electrode and the second type electrode, and control liquid crystal molecules in the liquid crystal layer to be oriented to form a liquid crystal lens, such that light passing through the liquid crystal lens converges to the first shading part; and the electrode structure is further configured to: apply no voltage to the first electrode, apply different voltages to the second electrode and the third electrode, and control the liquid crystal molecules to be oriented to form a liquid crystal grating, such that at least part of light passing through the liquid crystal grating is emitted from the light-transmitting area.

2. The display device of claim 1, wherein a main axis of the liquid crystal lens passes through the first shading part.

3. The display device of claim 1, wherein the first electrode and the second electrode are strip electrodes, and the third electrode is a planar electrode; and the plurality of first electrodes and the plurality of second electrodes in the electrode structure are all disposed along a first direction; the first type electrodes are disposed in even-numbered columns of the electrode structure, the second type electrodes are disposed in odd-numbered columns of the electrode structure, and in the direction vertical to the array substrate, orthographic projection of the first type electrode and the orthographic projection of the first shading part have an overlapping area.

4. The display device of claim 3, wherein in the direction vertical to the array substrate, the orthographic projection of the first electrode and orthographic projection of the second electrode have an overlapping area.

5. The display device of claim 3, wherein in the first direction, a width of the first electrode is smaller than a width of the second electrode.

6. The display device of claim 3, wherein each of the plurality of sub-pixel areas comprises n first shading parts, wherein n is a positive integer; and the electrode structure comprises 2n+1 first electrodes and 2n+1 second electrodes.

7. The display device of claim 6, wherein each of the plurality of sub-pixel areas comprises one third electrode.

8. The display device of claim 1, wherein each of the plurality of sub-pixel areas further comprises: a first thin film transistor connected with the first type electrode, and a second thin film transistor connected with the second type electrode.

9. The display device of claim 8, wherein each of the plurality of sub-pixel areas further comprises: a third thin film transistor connected with the third electrode; and in a direction vertical to the plane in which the display device is located, orthographic projection of the first thin film transistor overlaps orthographic projection of the third thin film transistor, or orthographic projection of the second thin film transistor overlaps the orthographic projection of the third thin film transistor.

10. The display device of claim 1, wherein a distance between the liquid crystal grating and the first shading part is greater than a distance between the liquid crystal lens and the first shading part.

11. The display device of claim 1, wherein the display device further comprises: a first insulating layer disposed between the first electrode and the liquid crystal layer, a second insulating layer disposed between the first electrode and the first shading part, and a third insulating layer disposed between the third electrode and the second electrode.

12. The display device of claim 1, wherein the array substrate comprises: a transparent substrate, and a light taking layer disposed on a side, facing the liquid crystal layer, of the transparent substrate.

13. The display device of claim 12, wherein the light taking layer comprises light taking grating structures disposed on a whole surface, or the light taking layer comprises a plurality of light taking grating structures.

14. The display device of claim 1, wherein the first electrode, the second electrode and the third electrode are all transparent electrodes.

15. A driving method of the display device of claim 1, comprising:

receiving signals of an image to be displayed; and providing voltage signals to the electrode structure according to gray-scale value of each of the plurality of sub-pixel areas in the signals of the image to be displayed, such that the liquid crystal molecules in the liquid crystal layer of each of the plurality of sub-pixel areas are oriented to form a liquid crystal lens or a liquid crystal grating.

16. The method of claim 15, wherein the step of providing voltage signals to the electrode structure according to gray-scale value of each of the plurality of sub-pixel areas in the signals of the image to be displayed, such that the liquid crystal molecules in the liquid crystal layer of each of the plurality of sub-pixel areas are oriented to form a liquid crystal lens or a liquid crystal grating, comprises:

when the gray-scale value of the each of the plurality of sub-pixel areas in the signals of the image to be displayed fall within a first preset gray-scale range, applying a same voltage signal to the first type electrode, the second electrode and the third electrode of the sub-pixel area, and applying different voltage signals to the second type electrode and the first type electrode of the sub-pixel area, to control the liquid crystal molecules in the liquid crystal layer of each of the plurality of sub-pixel areas to be oriented to form a liquid crystal lens; and when the gray-scale value of each of the plurality of sub-pixel areas in the signals of the image to be displayed fall within a second preset gray-scale range, applying no voltage signal to the first electrode of the sub-pixel area, and applying different voltage signals to the second electrode and the third electrode of the sub-pixel area, to control the liquid crystal molecules in the liquid crystal layer of each of the plurality of sub-pixel areas to be oriented to form a liquid crystal grating;

wherein the gray-scale value in the first preset gray-scale range is smaller than the gray-scale value in the second preset gray-scale range.

* * * * *

UNITED STATES PATENT AND TRADEMARK OFFICE
CERTIFICATE OF CORRECTION

PATENT NO. : 10,928,687 B1
APPLICATION NO. : 16/826256
DATED : February 23, 2021
INVENTOR(S) : Zhongxiao Li et al.

Page 1 of 1

It is certified that error appears in the above-identified patent and that said Letters Patent is hereby corrected as shown below:

On the Title Page

Item (65), Please add -- (65) Prior Publication Data
US2021/0033933 A1 February 4, 2021 --

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*